TOMPERT & COYLE.
Apparatus for Heating Tallow by Steam.
No. 29,018. Patented Jan'y 3. 1860.
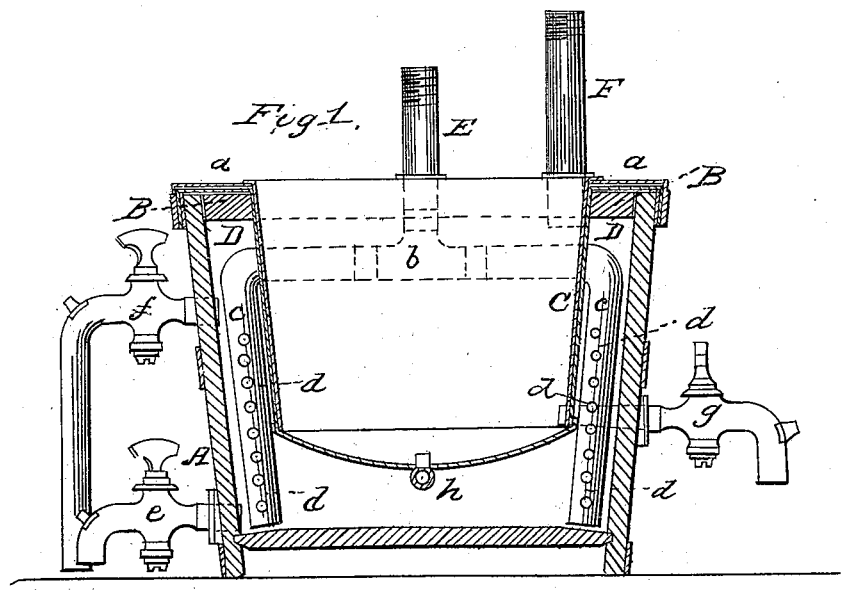
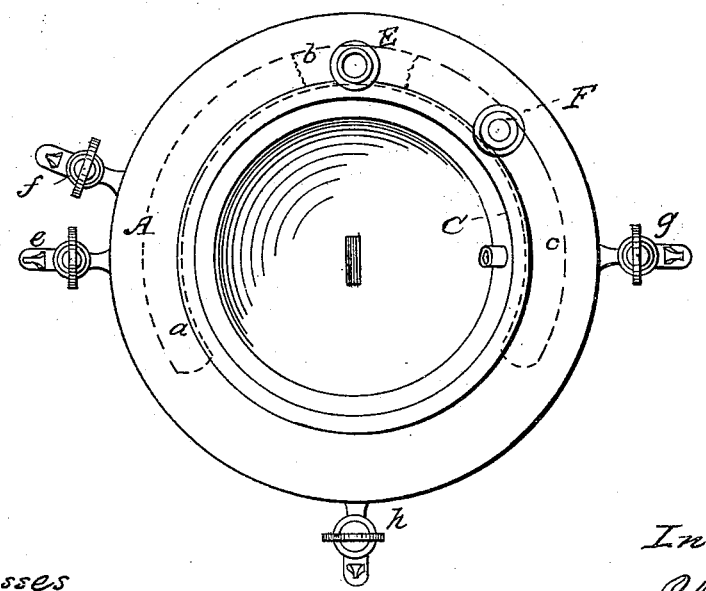
Witnesses
Inventor:

UNITED STATES PATENT OFFICE.

PHIL TOMPERT AND JOHN COYLE, OF LOUISVILLE, KENTUCKY.

APPARATUS FOR RENDERING FATS.

Specification of Letters Patent No. 29,018, dated July 3, 1860.

*To all whom it may concern:*

Be it known that we, PHIL TOMPERT and JOHN COYLE, both of Louisville, in the county of Jefferson and State of Kentucky, have invented a new and Improved Apparatus for Heating Tallow by Steam; and we do hereby declare that the following is a full, clear, and exact description of the same, reference being had to the accompanying drawings, forming part of this specification, in which—

Figure 1 represents a vertical central section of our invention. Fig. 2 is a plan or top view of the same.

Similar letters of reference in both views indicate corresponding parts.

The tallow is usually melted in an open copper kettle exposed to the direct action of the fire. This operation is defective because the tallow is very liable to become overheated and great care must be taken not to set fire to the tallow, and at the same time no provision is made to cool the tallow except by the influence of the open air causing a great loss of time. It has also been proposed to use steam for the purpose of heating the tallow instead of exposing the kettles to the fire and by these means the danger of setting fire to the tallow is obviated. But it is very desirable to be able to regulate the heat in such an apparatus and at the same time to be able to cool the tallow in as short a time as possible, and with these objects in view we have surrounded the kettle with a steam jacket into which the steam is conducted through a pipe terminating in two bent branches perforated with holes of different sizes for the purpose of causing the steam to heat all parts of the kettle with equal intensity, and which (steam jacket) communicates through a suitable pipe with a cold water reservoir and which is further provided with a series of faucets for the purpose of regulating the heat and to draw off the cold water and also the steam or the hot water as will be hereinafter more fully explained and described.

To enable those skilled in the art to make and use our invention we will proceed to describe its construction and operation with reference to the drawing.

A, represents a still or tub made of wood or any other material and perfectly steam and water tight. A wooden ring B, secured on the top of this still supports the kettle C, which is made of sheet copper and strips or rings $a$, of copper, which are fastened to the top edge of the tub, serve to close hermetically the annular space D, between the kettle and the tub. The steam is conducted to this space through the pipe E, which passes through the copper rings $a$, and through the wooden ring B, in the top of the tub, and which connects with an elbow $b$, from which two branch pipes $c$, extend one on each side. These branch pipes are bent around the kettle to about two thirds of its circumference and their ends are bent down and perforated with holes $d$, as clearly shown in Fig. 1. These holes are of different size those at the bottom being the largest and they become gradually smaller and smaller those on the top being the smallest so that the same quantity of steam passes out through each hole and that the sides of the kettle become heated uniformly all over. A faucet $e$, near to the bottom of the tub serves to let out the steam and to draw off the hot water which may accumulate at the bottom of the tub.

The annular space D, communicates through a pipe F, with a reservoir containing cold water. This pipe passes through the copper rings $a$, on the top of the tub and it terminates directly under the wooden ring B. A faucet $f$, passing through the side of the tub at about two thirds of its height from the bottom serves to draw off the cold water, or more properly speaking to keep up a circulation of cold water around the kettle, whenever it is desired to cool the tallow.

Two faucets $g$, and $h$, pass through the tub to the interior of the kettle. The faucet $g$, which passes through the side of the kettle, is used for drawing off the clean and clear tallow, after the same has been allowed to settle for a few minutes. The other faucet $h$, is at the bottom of the kettle and it is used to let out the remaining tallow. It can also be used when the kettle is cleaned to let out all the water (which is required for cleaning) and the remaining settlings.

The operation is as follows: The tallow is put into the copper kettle and all the faucets are closed with the exception of the steam and hot water faucet $e$. The steam is now turned on and in a short time the tallow is heated, and it can now be drawn off through the faucets $g$, and $h$, as above described. When the tallow becomes too hot the steam may be turned off the faucet $e$, closed and cold water let on, and by opening the faucet *h*, a current of cold water may be created, which will soon cool off the tallow. By these means the temperature of the tallow can be kept within a certain limit and the tallow can be drawn off perfectly clean so that our apparatus recommends itself to the public.

We do not claim the construction and combination of the double steam kettle with an annular space, neither do we claim as our invention any of the parts shown in the patents of J. J. Bate, Oct. 21, 1856, nor in that to the same dated Sept. 29, 1857, nor in that to Allen Lapham dated Nov. 10, 1857; but

Having thus described our invention what we claim as new and desire to secure by Letters Patent as an improved article of manufacture is—

A tub A, arranged with a kettle C, and steam pipe E, with perforated branches *c*, and with a cold water pipe F, and faucets *e*, and *f*, as and for the purposes set forth and described.

PHIL TOMPERT.
JOHN COYLE.

Witnesses:
F. Van Seggern,
Theo. B. Boyd.